US009476727B2

(12) United States Patent
Ziezold et al.

(10) Patent No.: US 9,476,727 B2
(45) Date of Patent: Oct. 25, 2016

(54) METHOD AND APPARATUS FOR PREDICTING DESTINATIONS

(71) Applicant: TomTom International B.V., Amsterdam (NL)

(72) Inventors: Hendrik Sebastian Ziezold, Amsterdam (NL); Daan Dirk Oostveen, Haarlem (NL)

(73) Assignee: TomTom International B.V., Amsterdam (NL)

( * ) Notice: Subject to any disclaimer, the term of this patent is extended or adjusted under 35 U.S.C. 154(b) by 0 days.

(21) Appl. No.: 14/424,477

(22) PCT Filed: Aug. 29, 2013

(86) PCT No.: PCT/EP2013/067955
§ 371 (c)(1),
(2) Date: Feb. 27, 2015

(87) PCT Pub. No.: WO2014/033239
PCT Pub. Date: Mar. 6, 2014

(65) Prior Publication Data
US 2015/0219468 A1 Aug. 6, 2015

(30) Foreign Application Priority Data
Aug. 29, 2012 (GB) .................................. 1215385.4

(51) Int. Cl.
| G01C 21/00 | (2006.01) |
|---|---|
| G01C 21/34 | (2006.01) |
| G01C 21/26 | (2006.01) |
| G01C 21/36 | (2006.01) |

(Continued)

(52) U.S. Cl.
CPC ....... G01C 21/3617 (2013.01); G01C 21/3453 (2013.01); G06N 5/04 (2013.01); G06N 7/005 (2013.01)

(58) Field of Classification Search
CPC combination set(s) only.
See application file for complete search history.

(56) References Cited

U.S. PATENT DOCUMENTS

| 6,941,222 B2 | 9/2005 | Yano et al. |
|---|---|---|
| 7,418,342 B1 | 8/2008 | Bell et al. |
| 7,487,017 B1 | 2/2009 | Bell et al. |

(Continued)

FOREIGN PATENT DOCUMENTS

| DE | 19839378 A1 | 3/2000 |
|---|---|---|
| JP | 2008070377 A | 3/2008 |

(Continued)

OTHER PUBLICATIONS

Search Report issued Dec. 14, 2012 for United Kingdom Patent Application No. 1215385.4.

(Continued)

*Primary Examiner* — Yonel Beaulieu

(57) ABSTRACT

Embodiments of the invention relate to a computer-implemented method of predicting a destination of a user of a mobile device, comprising selecting one or more geographic locations as a group of possible destinations based on a first location of the mobile device, determining a route from the first location to each of the geographic locations of the group of possible destinations according to one or more route planning criteria and digital map data, and updating the group of possible destinations based upon a second location of the mobile device and a change in an attribute of a route between the second location and each geographic location of the group of possible destinations.

20 Claims, 9 Drawing Sheets

(51) Int. Cl.
G06N 5/04 (2006.01)
G06N 7/00 (2006.01)

(56) References Cited

U.S. PATENT DOCUMENTS

| | | |
|---|---|---|
| 7,630,828 B2 | 12/2009 | Tajima et al. |
| 7,831,384 B2 | 11/2010 | Bill |
| 8,229,666 B2 | 7/2012 | Bell et al. |
| 8,478,642 B2 | 7/2013 | Dey et al. |
| 2002/0161517 A1 | 10/2002 | Yano et al. |
| 2006/0173841 A1 | 8/2006 | Bill |
| 2007/0150174 A1 | 6/2007 | Seymour et al. |
| 2009/0105934 A1 | 4/2009 | Tajima et al. |
| 2009/0248288 A1 | 10/2009 | Bell et al. |
| 2011/0046817 A1* | 2/2011 | Hamke ............... G05D 1/101 701/3 |
| 2012/0158289 A1 | 6/2012 | Brush et al. |
| 2012/0259542 A1* | 10/2012 | Hunig ............... G01C 21/3415 701/465 |
| 2013/0304379 A1* | 11/2013 | Fulger ............... G01C 21/3415 701/533 |
| 2014/0244153 A1* | 8/2014 | Dorum ............... G01C 21/3632 701/409 |
| 2015/0219468 A1* | 8/2015 | Ziezold ............... G01C 21/3453 701/410 |

FOREIGN PATENT DOCUMENTS

| | | |
|---|---|---|
| JP | 2010145115 A | 7/2010 |
| WO | 2007067842 A2 | 6/2007 |
| WO | 2010048146 A1 | 4/2010 |

OTHER PUBLICATIONS

International Search Report issued Dec. 9, 2013 for International Patent Application No. PCT/EP2013/067955.

\* cited by examiner

METHOD AND APPARATUS FOR PREDICTING DESTINATIONS

CROSS-REFERENCES TO RELATED APPLICATIONS

The present application is a National Stage of International Application No. PCT/EP2013/067955, filed on Aug. 29, 2013 and designating the United States, which claims benefit to United Kingdom Patent Application No. 1215385.4 filed on Aug. 29, 2012. The entire content of these applications are incorporated herein by reference.

FIELD OF THE INVENTION

This invention relates to mobile devices, and preferably navigation systems. Illustrative embodiments of the invention relate to portable navigation devices (so-called PNDs), in particular PNDs that include Global Positioning System (GPS) signal reception and processing functionality. Other embodiments relate, more generally, to any type of mobile processing device that is configured to execute navigation software so as to provide route planning, and preferably also navigation, functionality.

BACKGROUND TO THE INVENTION

Portable navigation devices (PNDs) that include GPS (Global Positioning System) signal reception and processing functionality are well known and are widely employed as in-car or other vehicle navigation systems.

In general terms, a modern PND comprises a processor, memory (at least one of volatile and non-volatile, and commonly both), and map data stored within said memory. The processor and memory cooperate to provide an execution environment in which a software operating system may be established, and additionally it is commonplace for one or more additional software programs to be provided to enable the functionality of the PND to be controlled, and to provide various other functions.

Typically these devices further comprise one or more input interfaces that allow a user to interact with and control the device, and one or more output interfaces by means of which information may be relayed to the user. Illustrative examples of output interfaces include a visual display and a speaker for audible output. Illustrative examples of input interfaces include one or more physical buttons to control on/off operation or other features of the device (which buttons need not necessarily be on the device itself but could be on a steering wheel if the device is built into a vehicle), and a microphone for detecting user speech. In a particularly preferred arrangement the output interface display may be configured as a touch sensitive display (by means of a touch sensitive overlay or otherwise) to additionally provide an input interface by means of which a user can operate the device by touch.

Devices of this type will also often include one or more physical connector interfaces by means of which power and optionally data signals can be transmitted to and received from the device, and optionally one or more wireless transmitters/receivers to allow communication over cellular telecommunications and other signal and data networks, for example Wi-Fi, Wi-Max GSM and the like.

PND devices of this type also include a GPS antenna by means of which satellite-broadcast signals, including location data, can be received and subsequently processed to determine a current location of the device.

The PND device may also include electronic gyroscopes and accelerometers which produce signals that can be processed to determine the current angular and linear acceleration, and in turn, and in conjunction with location information derived from the GPS signal, velocity and relative displacement of the device and thus the vehicle in which it is mounted. Typically such features are most commonly provided in in-vehicle navigation systems, but may also be provided in PND devices if it is expedient to do so.

The utility of such PNDs is manifested primarily in their ability to determine a route between a first location (typically a start or current location) and a second location (typically a destination). These locations can be input by a user of the device, by any of a wide variety of different methods, for example by postcode, street name and house number, previously stored "well known" destinations (such as famous locations, municipal locations (such as sports grounds or swimming baths) or other points of interest), and favourite or recently visited destinations.

Typically, the PND is enabled by software for computing a "best" or "optimum" route between the start and destination address locations from the map data. A "best" or "optimum" route is determined on the basis of predetermined criteria and need not necessarily be the fastest or shortest route. The selection of the route along which to guide the driver can be very sophisticated, and the selected route may take into account existing, predicted and dynamically and/or wirelessly received traffic and road information, historical information about road speeds, and the drivers own preferences for the factors determining road choice (for example the driver may specify that the route should not include motorways or toll roads).

In addition, the device may continually monitor road and traffic conditions, and offer to or choose to change the route over which the remainder of the journey is to be made due to changed conditions. Real time traffic monitoring systems, based on various technologies (e.g. mobile phone data exchanges, fixed cameras, GPS fleet tracking) are being used to identify traffic delays and to feed the information into notification systems.

PNDs of this type may typically be mounted on the dashboard or windscreen of a vehicle, but may also be formed as part of an on-board computer of the vehicle radio or indeed as part of the control system of the vehicle itself. The navigation device may also be part of a hand-held system, such as a PDA (Portable Digital Assistant), a media player, a mobile phone or the like, and in these cases, the normal functionality of the hand-held system is extended by means of the installation of software on the device to perform both route calculation and navigation along a calculated route.

Route planning and navigation functionality may also be provided by a desktop or mobile computing resource running appropriate software. For example, an on-line route planning and navigation facility is provided by TomTom International B.V. (routes.tomtom.com), which facility allows a user to enter a start point and a destination whereupon the server to which the user's PC is connected calculates a route (aspects of which may be user specified), generates a map, and generates a set of exhaustive navigation instructions for guiding the user from the selected start point to the selected destination. The facility also provides for pseudo three-dimensional rendering of a calculated route, and route preview functionality which simulates a user travelling along the route and thereby provides the user with a preview of the calculated route.

In the context of a PND, once a route has been calculated, the user interacts with the navigation device to select the desired calculated route, optionally from a list of proposed routes. Optionally, the user may intervene in, or guide the route selection process, for example by specifying that certain routes, roads, locations or criteria are to be avoided or are mandatory for a particular journey. The route calculation aspect of the PND forms one primary function, and navigation along such a route is another primary function.

During navigation along a calculated route, it is usual for such PNDs to provide visual and/or audible instructions to guide the user along a chosen route to the end of that route, i.e. the desired destination. It is also usual for PNDs to display map information on-screen during the navigation, such information regularly being updated on-screen so that the map information displayed is representative of the current location of the device, and thus of the user or user's vehicle if the device is being used for in-vehicle navigation.

An icon displayed on-screen typically denotes the current device location, and is centred with the map information of current and surrounding roads in the vicinity of the current device location and other map features also being displayed. Additionally, navigation information may be displayed, optionally in a status bar above, below or to one side of the displayed map information, examples of navigation information include a distance to the next deviation from the current road required to be taken by the user, the nature of that deviation possibly being represented by a further icon suggestive of the particular type of deviation, for example a left or right turn. The navigation function also determines the content, duration and timing of audible instructions by means of which the user can be guided along the route. As can be appreciated a simple instruction such as "turn left in 100 m" requires significant processing and analysis. As previously mentioned, user interaction with the device may be by a touch screen, or additionally or alternately by steering column mounted remote control, by voice activation or by any other suitable method.

A further important function provided by the device is automatic route re-calculation in the event that: a user deviates from the previously calculated route during navigation (either by accident or intentionally); real-time traffic conditions dictate that an alternative route would be more expedient and the device is suitably enabled to recognize such conditions automatically, or if a user actively causes the device to perform route re-calculation for any reason.

It is also known to allow a route to be calculated with user defined criteria; for example, the user may prefer a scenic route to be calculated by the device, or may wish to avoid any roads on which traffic congestion is likely, expected or currently prevailing. The device software would then calculate various routes and weigh more favourably those that include along their route the highest number of points of interest (known as POIs) tagged as being for example of scenic beauty, or, using stored information indicative of prevailing traffic conditions on particular roads, order the calculated routes in terms of a level of likely congestion or delay on account thereof. Other POI-based and traffic information-based route calculation and navigation criteria are also possible.

Although the route calculation and navigation functions are fundamental to the overall utility of PNDs, it is possible to use the device purely for information display, or "free-driving", in which only map information relevant to the current device location is displayed, and in which no route has been calculated and no navigation is currently being performed by the device. Such a mode of operation is often applicable when the user already knows the route along which it is desired to travel and does not require navigation assistance.

Devices of the type described above, for example the Go Live 1000 model manufactured and supplied by TomTom International B.V., provide a reliable means for enabling users to navigate from one position to another.

As noted above, navigation devices may be used in a "free-driving" mode where no destination location is entered into the device by the user. In this mode, even though the navigation device has access to one or both of map data and traffic information, the navigation device may be of limited use to the user as the device has no knowledge of the user's destination. Prior solutions to this problem are based upon the user's historic journeys, i.e. where the user has previously travelled. For example predicting that at a particular time of day the user may be travelling to their work or home location.

The present invention provides a method and apparatus for identifying possible destinations of the user and providing information to the user regarding a route to one or more possible destinations.

SUMMARY OF THE INVENTION

The present invention provides a computer-implemented method of predicting a destination of a user of a mobile device, comprising:

selecting one or more geographic locations as a group of possible destinations based on a first location of the mobile device;

determining a route from the first location to each of the geographic locations of the group of possible destinations according to one or more route planning criteria and digital map data; and updating the group of possible destinations based upon a second location of the mobile device and a change in an attribute of a route between the second location and each geographic location of the group of possible destinations.

The group of possible destinations may be an empty group of destinations or may comprise one or a plurality of destinations.

The method may be performed by the mobile device, wherein the digital map data is stored accessible to the mobile device. The digital map data may be stored in a memory device of the mobile device. The mobile device may be a navigation device or mobile device having navigational functionality.

The method may be used to provide information to a user of the mobile device without the user having entered their destination into the mobile device. The mobile device may display a map view representative of at least a portion of the map data including at least some of the group of possible destinations and each route thereto from the location of the mobile device. In this way the user may appreciate the road segments necessary to head toward each of the possible destinations, even if their actual destination is not one of the possible destinations. In another view, the mobile device may display a lane guidance view indicative of road lanes proximal to the location of the mobile device. The lane guidance view may indicate lanes forming part of the route to one or more possible destinations.

The method may comprise receiving traffic information, wherein the route to each possible destination is determined based on the traffic information. The method may comprise accessing a store of historic information indicative of previous traffic conditions on one or more road segments. The route may be further determined in accordance with the historic traffic information.

The present invention also provides an apparatus arranged to predict a destination of a user, comprising:

a processor and a memory, accessible to the processor, storing digital map data representative of a geographic region, wherein the processor is arranged to:

select one or more geographic locations as a group of possible destinations based on a first location of a mobile device;

determine a route from the first location to each of the geographic locations of the group of possible destinations according to one or more route planning criteria and the digital map data; and update the group of possible destinations based upon a second location of the mobile device and a change in an attribute of a route between the second location and each geographic location of the group of possible destinations.

The apparatus may further be arranged to determine the location of a mobile device. The location may be determined by a location determining unit arranged to receive wireless signals, e.g. signals from global navigation satellite systems, such as GPS, GLONASS, etc.

The possible destinations may be used to predict traffic conditions. For example, an estimate of upcoming traffic conditions may be formed based upon the possible destinations and associated routes.

The present invention also provides computer software operable, when executed on a computing system, to cause a processor to predict a destination of a user of a mobile device by:

selecting one or more geographic locations as a group of possible destinations based on a first location of the mobile device;

determining a route from the first location to each of the geographic locations of the group of possible destinations according to one or more route planning criteria and digital map data; and updating the group of possible destinations based upon a second location of the mobile device and a change in an attribute of a route between the second location and each geographic location of the group of possible destinations.

According to an aspect of the present invention there is provided a computer-implemented method of providing destination information, comprising selecting one or more geographic locations as possible destinations from an origin location;

determining a route from the origin location to each of the possible destinations according to one or more route planning criteria and digital map data;

providing, for display on a display device, information associated with at least some of the possible destinations; and periodically receiving updates to the digital map data and recalculating the route to each of the possible destinations using the updated digital map data.

The origin location may be, and typically will be, the location of the display device. The origin location may be selected by a user.

The one or more geographic locations may be selected as being within a predetermined distance and/or estimated travelling time of the display device. Alternatively, or additionally, the one or more geographic locations may be selected by a user.

The geographic locations may be selected based on direction information. The direction information may be associated with the display device. The direction information may indicate a heading of a vehicle passing the display device. The direction information may be obtained from a mobile device associated with the vehicle. The mobile device may be a navigation device associated with the vehicle. The selecting may further comprise determining a geographic region based on the heading and the predetermined distance and/or estimated travelling time. The geographic region may be a generally circular sector. The geographic locations may be within the geographic region. The recalculating may be performed at periodic intervals of 30 seconds, 1 minute, 2 minutes, or more. By periodically receiving updated map data, e.g. changed average speeds along roads of the road network due to, for example, traffic events, weather events or the like, and recalculating the route to each of the possible destinations, the routes to be displayed can take into account the changes in traffic and/or weather effecting travel on the road network. The information provided for display may reflect any changes to the route, such as changing a displayed map view showing the route(s), or changing information displayed on direction signs adjacent roadways.

The determination of the route may be based upon traffic information indicative of a traffic condition on one or more road segments. The traffic information may be indicative of substantially real-time traffic conditions on the road segments. The determination of the route may be based upon historic traffic information indicative of previous traffic conditions on one or more road segments.

The providing for display may comprise displaying an indication of a location of at least some of the possible destinations and the route associated with each possible destination. The providing for display may comprise providing a name of the at least some possible destinations for display on the display device, wherein the display device is associated with a road junction.

The determination of the route to each possible destination may be based upon digital map data. The digital map data may be stored in a memory. The display device may be associated with a refuelling station or parking facility, or any other point of interest (POI) as desired.

According to a still further aspect of the present invention there is provided a system for displaying destination information, comprising:

a processing device; and a memory storing digital map data accessible to the processing device, wherein the processing device is arranged to:

select one or more geographic locations from the digital map data as possible destinations from an origin location;

determine a route from the origin location to each of the possible destinations according to one or more route planning criteria and the digital map data;

provide, for display on a display device, information associated with at least some of the possible destinations; and periodically receive updates to the digital map data and recalculate the route to each of the possible destinations using the updated digital map data.

The system may comprise one or more display devices communicably coupled to the processing device.

The providing for display may be performed by the processor causing the possible destinations and associated routes to be transmitted to the display device. The transmitted possible destinations and routes may be received by one or more devices associated with the display devices. The transmitting may be across a computer network or a wireless transmission system.

BRIEF DESCRIPTION OF THE DRAWINGS

Various embodiments of the present invention will now be described with reference to the accompanying drawings, in which.

DETAILED DESCRIPTION OF PREFERRED EMBODIMENTS

Preferred embodiments of the present invention will now be described with particular reference to a PND. It should be remembered, however, that the teachings of the present invention are not limited to PNDs but are instead universally applicable to any type of mobile processing device that is configured to execute navigation software so as to provide route planning and navigation functionality. It follows therefore that in the context of the present application, a navigation device is intended to include (without limitation) any type of mobile route planning and navigation device, irrespective of whether that device is embodied as a PND, a navigation device built into a vehicle, or a mobile telephone or portable digital assistant (PDA)) executing route planning and navigation software.

Figure 1:
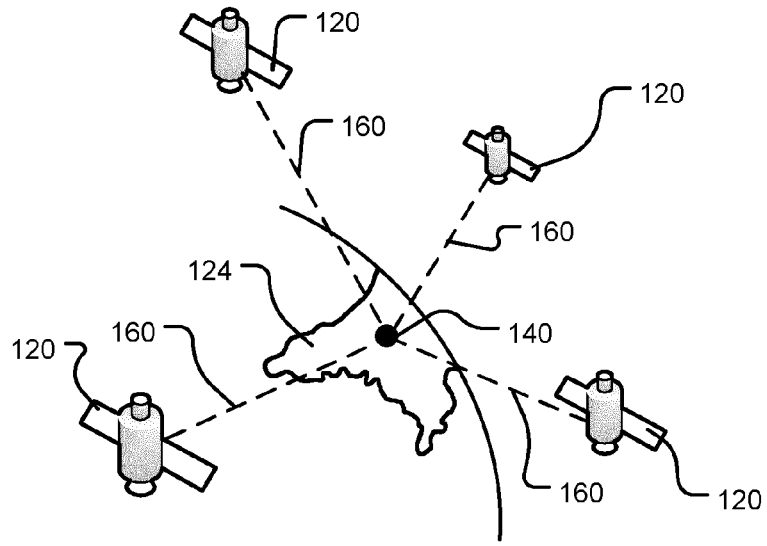
FIG. 1 is a schematic illustration of a Global Positioning System (GPS)

With the above provisos in mind, FIG. 1 illustrates an example view of Global Positioning System (GPS), usable by navigation devices. Such systems are known and are used for a variety of purposes. In general, GPS is a satellite-radio based navigation system capable of determining continuous position, velocity, time, and in some instances direction information for an unlimited number of users. Formerly known as NAVSTAR, the GPS incorporates a plurality of satellites which orbit the earth in extremely precise orbits. Based on these precise orbits, GPS satellites can relay their location to any number of receiving units.

The GPS system is implemented when a device, specially equipped to receive GPS data, begins scanning radio frequencies for GPS satellite signals. Upon receiving a radio signal from a GPS satellite, the device determines the precise location of that satellite via one of a plurality of different conventional methods. The device will continue scanning, in most instances, for signals until it has acquired at least three different satellite signals (noting that position is not normally, but can be determined, with only two signals using other triangulation techniques). Implementing geometric triangulation, the receiver utilizes the three known positions to determine its own two-dimensional position relative to the satellites. This can be done in a known manner. Additionally, acquiring a fourth satellite signal will allow the receiving device to calculate its three dimensional position by the same geometrical calculation in a known manner. The position and velocity data can be updated in real time on a continuous basis by an unlimited number of users.

As shown in FIG. 1, the GPS system is denoted generally by reference numeral 100. A plurality of satellites 120 are in orbit about the earth 124. The orbit of each satellite 120 is not necessarily synchronous with the orbits of other satellites 120 and, in fact, is likely asynchronous. A GPS receiver 140 is shown receiving spread spectrum GPS satellite signals 160 from the various satellites 120.

The spread spectrum signals 160, continuously transmitted from each satellite 120, utilize a highly accurate frequency standard accomplished with an extremely accurate atomic clock. Each satellite 120, as part of its data signal transmission 160, transmits a data stream indicative of that particular satellite 120. It is appreciated by those skilled in the relevant art that the GPS receiver device 140 generally acquires spread spectrum GPS satellite signals 160 from at least three satellites 120 for the GPS receiver device 140 to calculate its two-dimensional position by triangulation. Acquisition of an additional signal, resulting in signals 160 from a total of four satellites 120, permits the GPS receiver device 140 to calculate its three-dimensional position in a known manner.

Figure 2:
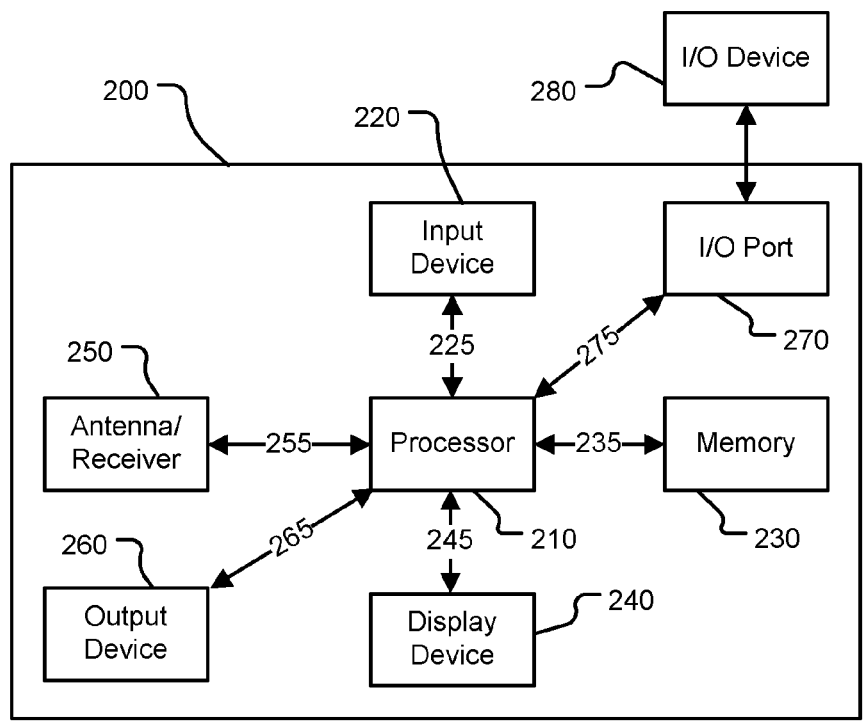
FIG. 2 is a schematic illustration of electronic components arranged to provide a navigation device.

FIG. 2 is an illustrative representation of electronic components of a navigation device 200 according to a preferred embodiment of the present invention, in block component format. It should be noted that the block diagram of the navigation device 200 is not inclusive of all components of the navigation device, but is only representative of many example components.

The navigation device 200 is located within a housing (not shown). The housing includes a processor 210 connected to an input device 220 and a display screen 240. The input device 220 can include a keyboard device, voice input device, touch panel and/or any other known input device utilised to input information; and the display screen 240 can include any type of display screen such as an LCD display, for example. In a particularly preferred arrangement the input device 220 and display screen 240 are integrated into an integrated input and display device, including a touchpad or touchscreen input so that a user need only touch a portion of the display screen 240 to select one of a plurality of display choices or to activate one of a plurality of virtual buttons.

The navigation device may include an output device 260, for example an audible output device (e.g. a loudspeaker). As output device 260 can produce audible information for a user of the navigation device 200, it is should equally be understood that input device 240 can include a microphone and software for receiving input voice commands as well.

In the navigation device 200, processor 210 is operatively connected to and set to receive input information from input device 220 via a connection 225, and operatively connected to at least one of display screen 240 and output device 260, via output connections 245, to output information thereto. Further, the processor 210 is operably coupled to a memory resource 230 via connection 235 and is further adapted to receive/send information from/to input/output (I/O) ports 270 via connection 275, wherein the I/O port 270 is connectible to an I/O device 280 external to the navigation device 200. The memory resource 230 comprises, for example, a volatile memory, such as a Random Access Memory (RAM) and a non-volatile memory, for example a digital memory, such as a flash memory. The external I/O device 280 may include, but is not limited to an external listening device such as an earpiece for example. The connection to I/O device 280 can further be a wired or wireless connection to any other external device such as a car stereo unit for hands-free operation and/or for voice activated operation for example, for connection to an ear piece or head phones, and/or for connection to a mobile phone for example, wherein the mobile phone connection may be used to establish a data connection between the navigation device 200 and the internet or any other network for example, and/or to establish a connection to a server via the internet or some other network for example.

FIG. 2 further illustrates an operative connection between the processor 210 and an antenna/receiver 250 via connection 255, wherein the antenna/receiver 250 can be a GPS antenna/receiver for example. It will be understood that the antenna and receiver designated by reference numeral 250 are combined schematically for illustration, but that the antenna and receiver may be separately located components, and that the antenna may be a GPS patch antenna or helical antenna for example.

Further, it will be understood by one of ordinary skill in the art that the electronic components shown in FIG. 2 are powered by power sources (not shown) in a conventional manner. As will be understood by one of ordinary skill in the art, different configurations of the components shown in FIG. 2 are considered to be within the scope of the present application. For example, the components shown in FIG. 2 may be in communication with one another via wired and/or wireless connections and the like. Thus, the scope of the navigation device 200 of the present application includes a portable or handheld navigation device 200.

In addition, the portable or handheld navigation device 200 of FIG. 2 can be connected or "docked" in a known manner to a vehicle such as a bicycle, a motorbike, a car or a boat for example. Such a navigation device 200 is then removable from the docked location for portable or handheld navigation use.

Figure 3:
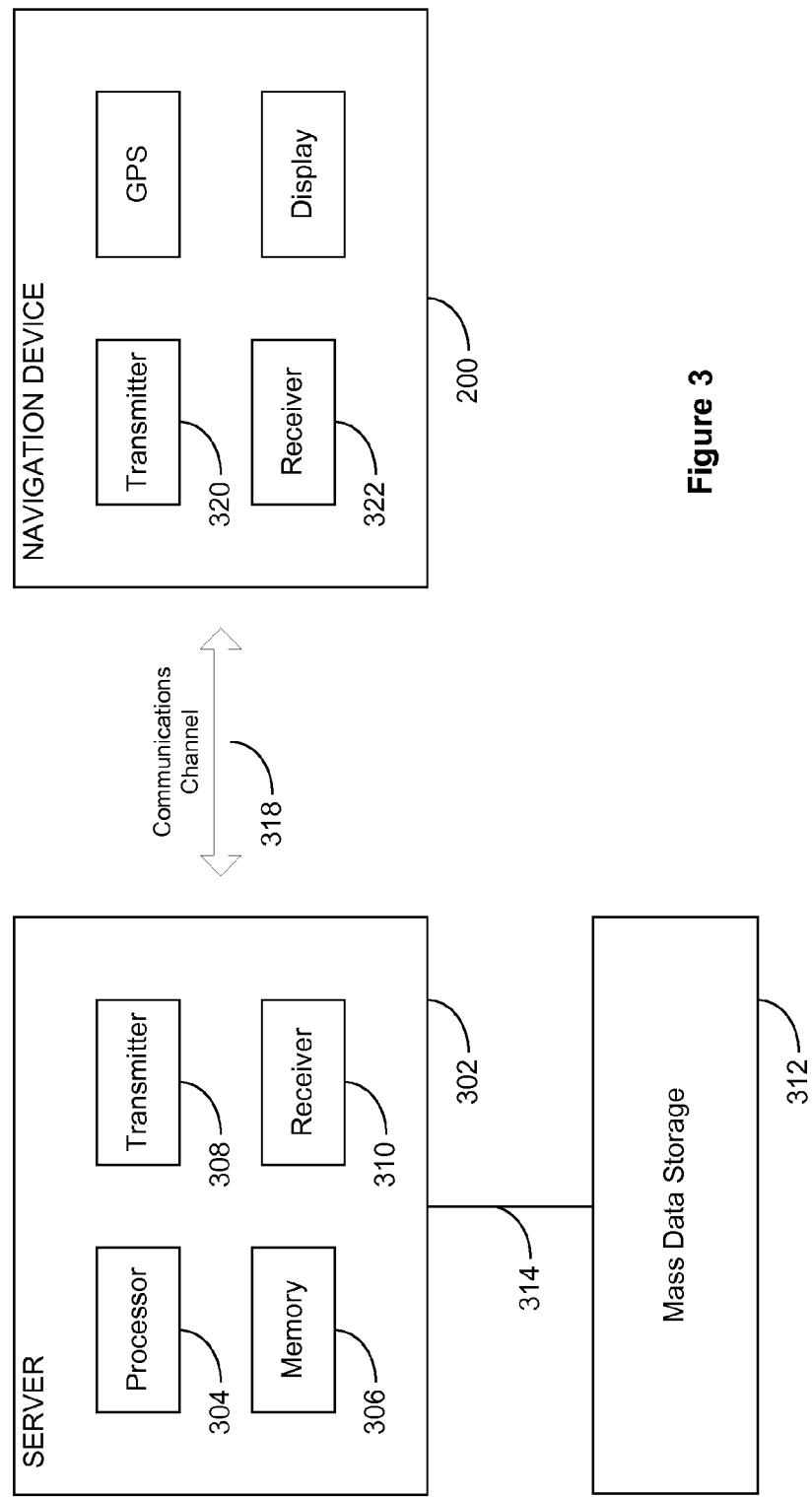
FIG. 3 is a schematic illustration of the manner in which a navigation device may receive information over a wireless communication channel.

Referring now to FIG. 3, the navigation device 200 may establish a "mobile" or telecommunications network connection with a server 302 via a mobile device (not shown) (such as a mobile phone, PDA, and/or any device with mobile phone technology) establishing a digital connection (such as a digital connection via known Bluetooth technology for example). Thereafter, through its network service provider, the mobile device can establish a network connection (through the internet for example) with a server 302. As such, a "mobile" network connection is established between the navigation device 200 (which can be, and often times is mobile as it travels alone and/or in a vehicle) and the server 302 to provide a "real-time" or at least very "up to date" gateway for information.

The establishing of the network connection between the mobile device (via a service provider) and another device such as the server 302, using an internet (such as the World Wide Web) for example, can be done in a known manner. This can include use of TCP/IP layered protocol for example. The mobile device can utilize any number of communication standards such as CDMA, GSM, WAN, etc.

As such, an internet connection may be utilised which is achieved via data connection, via a mobile phone or mobile phone technology within the navigation device 200 for example. For this connection, an internet connection between the server 302 and the navigation device 200 is established. This can be done, for example, through a mobile phone or other mobile device and a GPRS (General Packet Radio Service)-connection (GPRS connection is a high-speed data connection for mobile devices provided by telecom operators; GPRS is a method to connect to the internet).

The navigation device 200 can further complete a data connection with the mobile device, and eventually with the internet and server 302, via existing Bluetooth technology for example, in a known manner, wherein the data protocol can utilize any number of standards, such as the GSRM, the Data Protocol Standard for the GSM standard, for example.

The navigation device 200 may include its own mobile phone technology within the navigation device 200 itself (including an antenna for example, or optionally using the internal antenna of the navigation device 200). The mobile phone technology within the navigation device 200 can include internal components as specified above, and/or can include an insertable card (e.g. Subscriber Identity Module or SIM card), complete with necessary mobile phone technology and/or an antenna for example. As such, mobile phone technology within the navigation device 200 can similarly establish a network connection between the navigation device 200 and the server 302, via the internet for example, in a manner similar to that of any mobile device.

For GRPS phone settings, a Bluetooth enabled navigation device may be used to correctly work with the ever changing spectrum of mobile phone models, manufacturers, etc., model/manufacturer specific settings may be stored on the navigation device 200 for example. The data stored for this information can be updated.

In FIG. 3 the navigation device 200 is depicted as being in communication with the server 302 via a generic communications channel 318 that can be implemented by any of a number of different arrangements. The server 302 and a navigation device 200 can communicate when a connection via communications channel 318 is established between the server 302 and the navigation device 200 (noting that such a connection can be a data connection via mobile device, a direct connection via personal computer via the internet, etc.).

The server 302 includes, in addition to other components which may not be illustrated, a processor 304 operatively connected to a memory 306 and further operatively connected, via a wired or wireless connection 314, to a mass data storage device 312. The processor 304 is further operatively connected to transmitter 308 and receiver 310, to transmit and send information to and from navigation device 200 via communications channel 318. The signals sent and received may include data, communication, and/or other propagated signals. The transmitter 308 and receiver 310 may be selected or designed according to the communications requirement and communication technology used in the communication design for the navigation system 200.

Further, it should be noted that the functions of transmitter 308 and receiver 310 may be combined into a signal transceiver.

Server 302 is further connected to (or includes) a mass storage device 312, noting that the mass storage device 312 may be coupled to the server 302 via communication link 314. The mass storage device 312 contains a store of navigation data and map information, and can again be a separate device from the server 302 or can be incorporated into the server 302.

The navigation device 200 is adapted to communicate with the server 302 through communications channel 318, and includes processor, memory, etc. as previously described with regard to FIG. 2, as well as transmitter 320 and receiver 322 to send and receive signals and/or data through the communications channel 318, noting that these devices can further be used to communicate with devices other than server 302. Further, the transmitter 320 and receiver 322 are selected or designed according to communication requirements and communication technology used in the communication design for the navigation device 200 and the functions of the transmitter 320 and receiver 322 may be combined into a single transceiver.

Software stored in server memory 306 provides instructions for the processor 304 and allows the server 302 to provide services to the navigation device 200. One service provided by the server 302 involves processing requests from the navigation device 200 and transmitting navigation data from the mass data storage 312 to the navigation device 200. Another service provided by the server 302 includes processing the navigation data using various algorithms for a desired application and sending the results of these calculations to the navigation device 200.

The communication channel 318 generically represents the propagating medium or path that connects the navigation device 200 and the server 302. Both the server 302 and navigation device 200 include a transmitter for transmitting data through the communication channel and a receiver for receiving data that has been transmitted through the communication channel.

The communication channel 318 is not limited to a particular communication technology. Additionally, the communication channel 318 is not limited to a single communication technology; that is, the channel 318 may include several communication links that use a variety of technology. For example, the communication channel 318 can be adapted to provide a path for electrical, optical, and/or electromagnetic communications, etc. As such, the communication channel 318 includes, but is not limited to, one or a combination of the following: electric circuits, electrical conductors such as wires and coaxial cables, fibre optic cables, converters, radio-frequency (RF) waves, the atmosphere, empty space, etc. Furthermore, the communication channel 318 can include intermediate devices such as routers, repeaters, buffers, transmitters, and receivers, for example.

In one illustrative arrangement, the communication channel 318 includes telephone and computer networks. Furthermore, the communication channel 318 may be capable of accommodating wireless communication such as radio frequency, microwave frequency, infrared communication, etc. Additionally, the communication channel 318 can accommodate satellite communication.

The communication signals transmitted through the communication channel 318 include, but are not limited to, signals as may be required or desired for given communication technology. For example, the signals may be adapted to be used in cellular communication technology such as Time Division Multiple Access (TDMA), Frequency Division Multiple Access (FDMA), Code Division Multiple Access (CDMA), Global System for Mobile Communications (GSM), etc. Both digital and analogue signals can be transmitted through the communication channel 318. These signals may be modulated, encrypted and/or compressed signals as may be desirable for the communication technology.

The server 302 includes a remote server accessible by the navigation device 200 via a wireless channel. The server 302 may include a network server located on a local area network (LAN), wide area network (WAN), virtual private network (VPN), etc.

The server 302 may include a personal computer such as a desktop or laptop computer, and the communication channel 318 may be a cable connected between the personal computer and the navigation device 200. Alternatively, a personal computer may be connected between the navigation device 200 and the server 302 to establish an internet connection between the server 302 and the navigation device 200. Alternatively, a mobile telephone or other handheld device may establish a wireless connection to the internet, for connecting the navigation device 200 to the server 302 via the internet.

The navigation device 200 may be provided with information from the server 302 via information downloads which may be periodically updated automatically or upon a user connecting navigation device 200 to the server 302 and/or may be more dynamic upon a more constant or frequent connection being made between the server 302 and navigation device 200 via a wireless mobile connection device and TCP/IP connection for example. For many dynamic calculations, the processor 304 in the server 302 may be used to handle the bulk of the processing needs, however, processor 210 of navigation device 200 can also handle much processing and calculation, oftentimes independent of a connection to a server 302.

As indicated above in FIG. 2, a navigation device 200 includes a processor 210, an input device 220, and a display screen 240. The input device 220 and display screen 240 are integrated into an integrated input and display device to enable both input of information (via direct input, menu selection, etc.) and display of information through a touch panel screen, for example. Such a screen may be a touch input LCD screen, for example, as is well known to those of ordinary skill in the art. Further, the navigation device 200 can also include any additional input device 220 and/or any additional output device 241, such as audio input/output devices for example.

Figure 4:
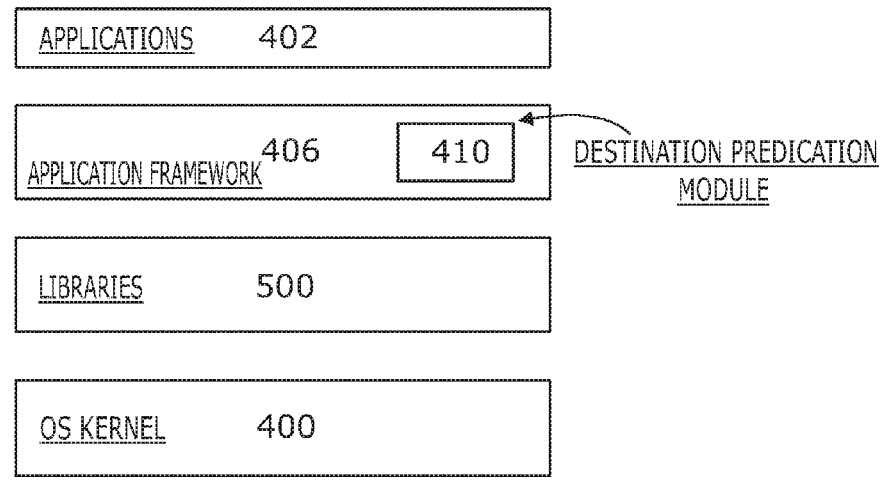
FIG. 4 shows a preferred embodiment of a software stack on a preferred mobile navigation device.

FIG. 4 shows a software stack that may be used in a preferred embodiment of the mobile navigation device 200. The stack comprises an OS kernel 400. This may include display drivers, keypad drivers, camera drivers, power management, audio drivers, etc. The stack also comprises libraries 500, e.g. including graphics libraries, runtime libraries, etc. The stack also comprises an application framework 406, which includes a destination prediction module (DPM) 410 and may also include, for example, a window manager, resource manger notification manger, a telephony manager, etc. The stack also comprises one or more applications 402 which have access to various libraries and drivers of the OS kernel 400.

It will be noted that some embodiments of the invention are described as being performed by the DPM 410 of the navigation device 200. However the DPM 410 may also be executed by other mobile devices. For example, the DPM 410 may reside on any location aware mobile device which provides navigation functionality, such as a smartphone, tablet computer or the like. In some embodiments the DPM 410 may be executed by a server computer which is arranged to receive trace data from one or more mobile devices. The trace data comprises a series of data points indicative of the location of each mobile device at periodic time intervals.

Furthermore, other embodiments of the invention the DPM may be executed by a processor associated with one or more display devices arranged to display information thereon associated with routes to destinations, as will be explained in more detail below, particularly with reference to FIGS. 12 and 13. The one or more display devices may be located at predetermined locations within a road network. Such display devices may be, for example, associated with a vehicle refuelling station or a portion of a road network such as a junction.

Figure 5:
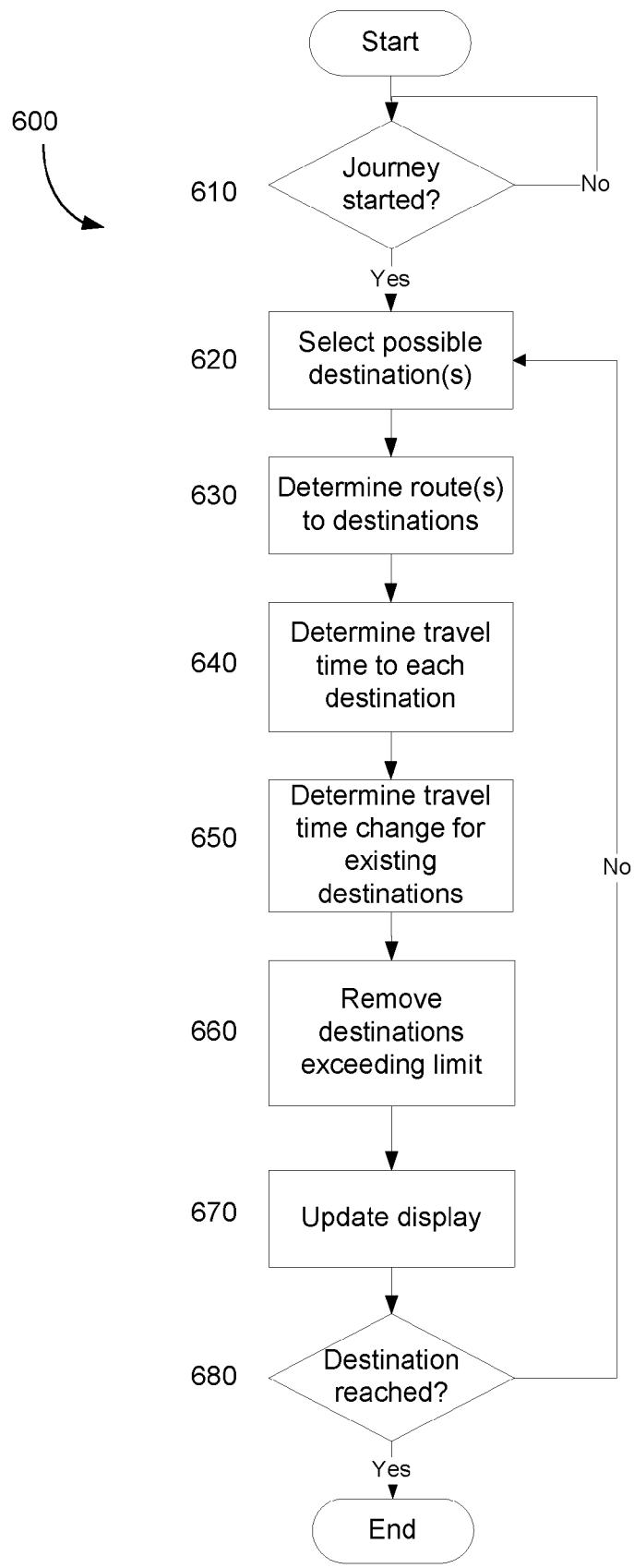
FIG. 5 illustrates a method according to an embodiment of the invention.

FIG. 5 illustrates a method 600 according to an embodiment of the invention. The method may be performed by the DPM 410 illustrated in FIG. 4. The method 600 may also be performed by another apparatus, such as a server computer, operating on the trace data received from the navigation device 200 or other mobile device. For the purpose of explanation the method 600 will be explained as being executed by the DPM 410 of the navigation device 200, although it will be realised that this is merely an exemplary illustration.

In step 610 the method 600 determines when a journey has begun. If it is not determined that the journey has begun then the method 600 loops back to step 610, i.e. the method waits until it is determined that the journey has begun. In some embodiments, it is determined that the journey has begun when the navigation device 200 is activated, which may be responsive to user actuation of a power switch of the navigation device, a user starting a navigation application on a mobile device, or power being provided to the navigation device 200 by a vehicle. It will be realised that in embodiments where the method 600 is performed by an apparatus other than the navigation device 200 step 610 may be omitted or modified. For example, the server computer may only receive data from the navigation device once the journey has begun or the server may perform the method upon trace data received from the navigation device and may perform step 610 to determine where in the received trace data the journey begins i.e. where the trace data contains more than one data point indicative of the same location before the journey begins.

In one embodiment, step 610 comprises determining when the navigation device 200 begins to move or change location indicative of the start of the journey. Step 610 may thus comprise determining whether the location of the navigation device 200 has changed. Determination of whether the location of the navigation device 200 has changed may be performed with respect to signals, such as the GPS signals, wirelessly received by the navigation device 200. When the method 600 is being performed by another apparatus, such as the server, the determination may be achieved by considering data points in the trace data. It may be determined that the location of the navigation device 200 has changed if the wireless signals or data points indicate that the navigation device has moved by more than a predetermined distance from an initial location, such as 50 m, 100 m or 0.5 km, although it will be realised that these distances are merely exemplary. In another embodiment step 610 may comprise determining whether the navigation device is moving at more than a predetermined speed, such as 10 km/h, 20 km/h or 30 km/h, although it will be realised that these speeds are merely exemplary. The server may determine that the navigation device is moving at more than the predetermined speed based on a distance and time between data points of the trace data. In embodiments comprising step 610, when it is determined that the journey has begun the method moves to step 620.

In step 620 one or more possible destinations are selected. In one embodiment, the possible destinations are selected based upon a distance from the current location of the navigation device 200. The possible locations may be selected as geographic features within a predetermined distance of the current location. The predetermined distance may be a radius, such as 10 km, 20 km, 30 km or 50 km, around the current location of the navigation device 200, although it will be realised that these distances are merely exemplary and that other distances can be chosen. The geographic features from which the possible destinations are selected may be any geographic features which the user may be likely to travel to, or via. For example, the geographic features may include points-of-interest or exits from major roads, etc. In one embodiment the geographic features from which the possible destinations are selected are city centres. A city may be considered as any urban or built-up area above a predetermined size, wherein size may be based upon a population of the area. Thus, in one embodiment of step 620, city centres within a 30 km radius of the current location of the navigation device 200 are selected as possible destinations for the user of the navigation device 200.

The selected possible destinations may be stored in a data structure, such as a list, in order to aid processing in further steps and operation of the method 600. Thus the possible destinations are added to a group of possible destinations which is updated during each iteration of the method 600. For the purposes of explanation of calculations below, it will be assumed that each possible destination is added to an array destination$_i$ where the subscript i indicates the element of the array and i assumes an integer value from 1 to N where N is the current total number of possible destinations. As will be explained, possible destinations may be removed from the array and new destinations added to the array on a dynamic basis.

Figure 6:
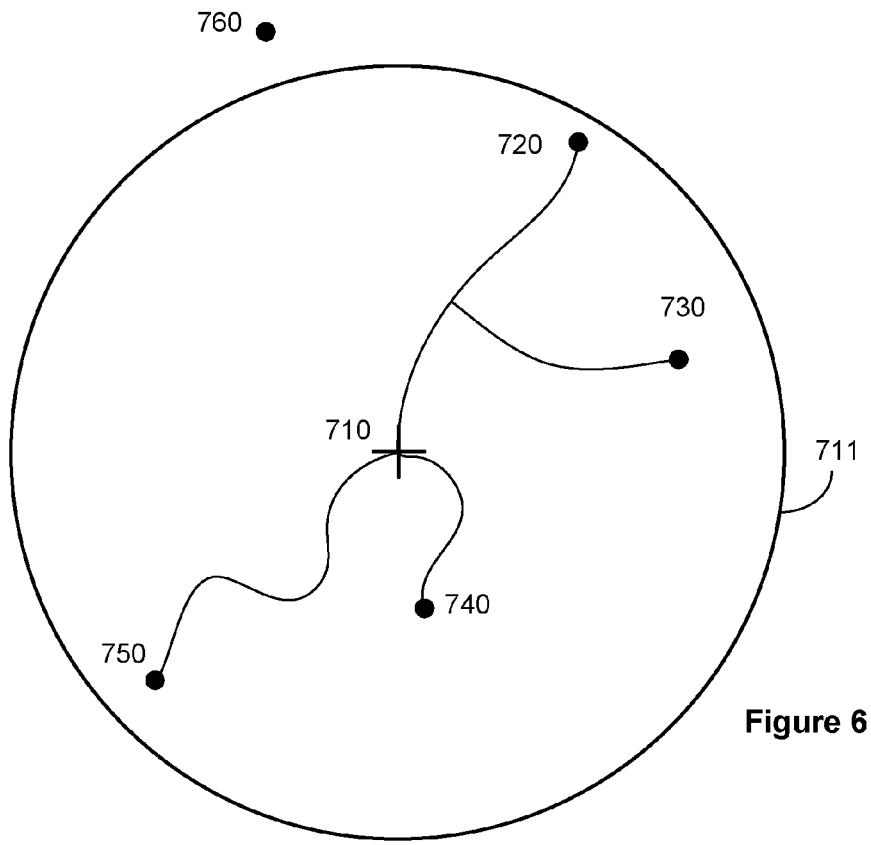
FIG. 6 illustrates a road network and possible destinations identified according to an embodiment of the invention.

FIG. 6 illustrates a geographic area around a location 710 of the navigation device 200. Circle 711 indicates a periphery of a region within the 30 km radius of the location 710 of the navigation device 200. Within this periphery 711 there are four city centres selected as possible destinations in step 620 which are denoted with reference numerals 720, 730, 740 and 750. It will be noted that location 760 has not been selected as being outside of the region 711.

In step 630 a route to each possible destination 720, 730, 740, 750 is determined. Step 630 may comprise performing a plurality of source-to-destination route searches using an appropriate algorithm. Such an algorithm may be a Dijkstra-based route search, although other types of route search algorithm may be used. The route to each destination may be determined according to one or more route planning criteria, as is known in the art. For example, each route may be determined according to route planning criteria which require that a fastest route to each destination be found, or that a route having a shortest distance to each possible destination be found. The route planning criteria may also take into account the user's preferred choice of road type, current traffic conditions, etc, as is known to the skilled person. Thus, as a result of step 630, a route is determined from the current location 710 of the navigation device 200 to each of the possible destinations 720, 730, 740, 750 as shown in FIG. 6.

In step 640 a journey parameter associated with each route is determined. As shown in FIG. 6, the journey parameter may be an estimated duration of the journey to each of the possible destinations 720, 730, 740, 750 via the associated route. However, in other embodiments the parameter may be, for example, a journey distance via the route to each respective possible destination 720, 730, 740, 750. For the purpose of explanation embodiments of the invention will be explained with reference to journey duration from the current location 710. Thus a journey duration t is determined for each possible destination 720, 730, 740, 750 which may also be stored in an array as $t_i$ where i indicates the array element consistent with the possible destination array.

In step 650 a change in journey duration for each of the possible destinations 720, 730, 740, 750 is determined. The change in journey duration may be determined in comparison to the journey duration estimated at a previous data point forming the trace data, which may not necessarily be the an adjacent data point, i.e. the journey duration at a last data n point may be compared against the journey duration at data point n–2, for example. However in other embodiments the change in journey duration may be the change from the journey duration calculated in a previous iteration of step 650 and, in this case, it will be realised that for a first iteration of step 650 where all of the possible destinations have newly selected, it will not be possible to determine the change in journey duration. Therefore step 650 may be omitted from the first iteration of the method in some embodiments. It will also be realised that where one or more new possible destinations have been selected in step 620 and added to an existing one or more possible destinations, the change in journey duration for the new possible destinations may not be determined in the first subsequent performance of step 650. The determination of the change in journey duration from the previous iteration of step 650 provides a value of $\Delta t_i$ for each respective possible destination for which it is possible to determine the change in journey duration.

It will be realised that for possible destinations having an associated negative $\Delta t$ this indicates the location of the navigation device 200 has moved closer to the possible destination. Thus the user's actual destination is likely to be at, relatively close to, or in the region of, the one or more possible destinations having negative values of $\Delta t$. In contrast, possible destinations having positive values of $\Delta t$ are less likely to be close to the user's actual destination. Even for possible destinations proximal to the user's actual location at some points of the journey their respective $\Delta t$ values may become positive, for example as the user temporarily follows a road segment heading away from the possible destination.

In step 660 in some embodiments, in order to maintain the number of possible destinations at a manageable level, for example for memory storage and processing time considerations, possible destinations may be removed from the list of possible destination even when they remain within the region 711 less than the predetermined distance from the current location of the navigation device 200. Possible destinations may be removed based upon a difference between their current journey duration and their lowest journey duration. The lowest journey duration is maintained for each possible destination to record the lowest encountered journey duration to that possible destination. If the difference is more than a predetermined limit then the possible destination is removed. The predetermined limit may be 10 minutes, although other limits may be envisaged.

Therefore, by way of an example, if the lowest encountered journey duration to a possible destination is 33 minutes and the current journey duration rises to 43 minutes or more, the possible destination is removed or deleted from the list possible destinations. Possible destinations that have been removed or deleted may not be re-selected in subsequent iterations of step 620 in some embodiments. Thus the list of possible destinations is dynamically maintained by removing possible destinations based upon the current journey duration and historic journey duration.

In step 670 the display screen 240 of the navigation device 200 is updated. Embodiments of the invention aim to aid a user in navigating to a destination even when the navigation device has not been programmed with the destination by the user. Furthermore, embodiments of the invention do not require the user to have previously visited the destination in order for it to be considered a possible destination. In order to assist the user in navigating in this way information directing the user to one or more of the possible destinations may be displayed on the display screen 240.

Figure 7:
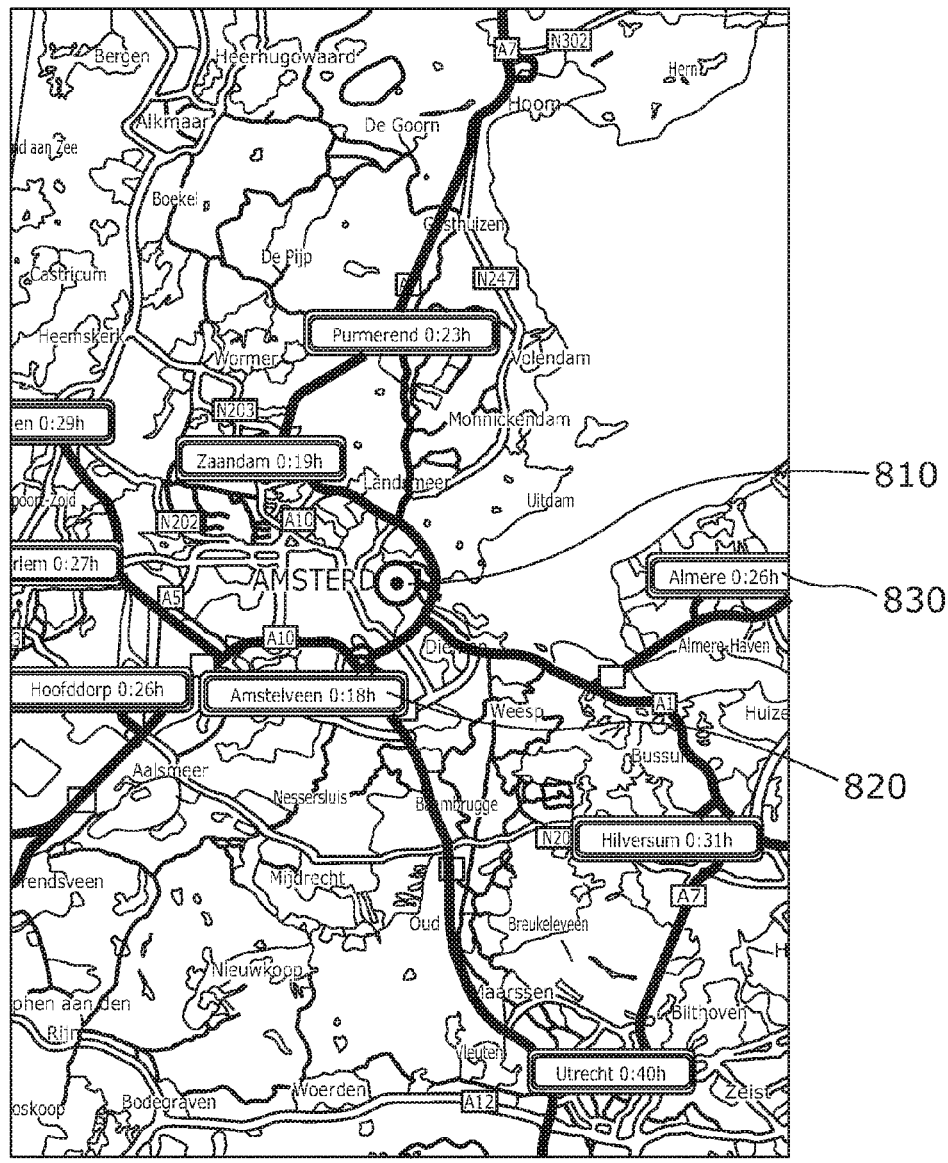
FIG. 7 illustrates an output of an embodiment of the invention.

FIG. 7 illustrates a map view of a plurality of possible destinations and their associated routes from the current location of the navigation device 200. In the map view a map of a geographic area proximal to the current location of the navigation device is displayed on the display screen 240, as shown in FIG. 7, which may be in a 2D or pseudo-3D overview. The current location of the navigation device 200 is indicated with an associated icon 810 and the map is centred generally on that location. FIG. 7 includes identification of a number of possible destinations 820, 830 only some of which are identified with specific reference numerals. Each of the possible destinations is identified with an associated icon indicating the name of the possible destination and the estimated journey time to that destination along the determined route, which is also indicated by highlighting of the road segments forming the route.

Advantageously the display shown in FIG. 7 allows the user to observe their current location 810 and the best route determined according to the route planning criteria and, in some embodiments, also current traffic conditions to possible destinations 820, 830 determined by the DPM 410.

Figure 8:
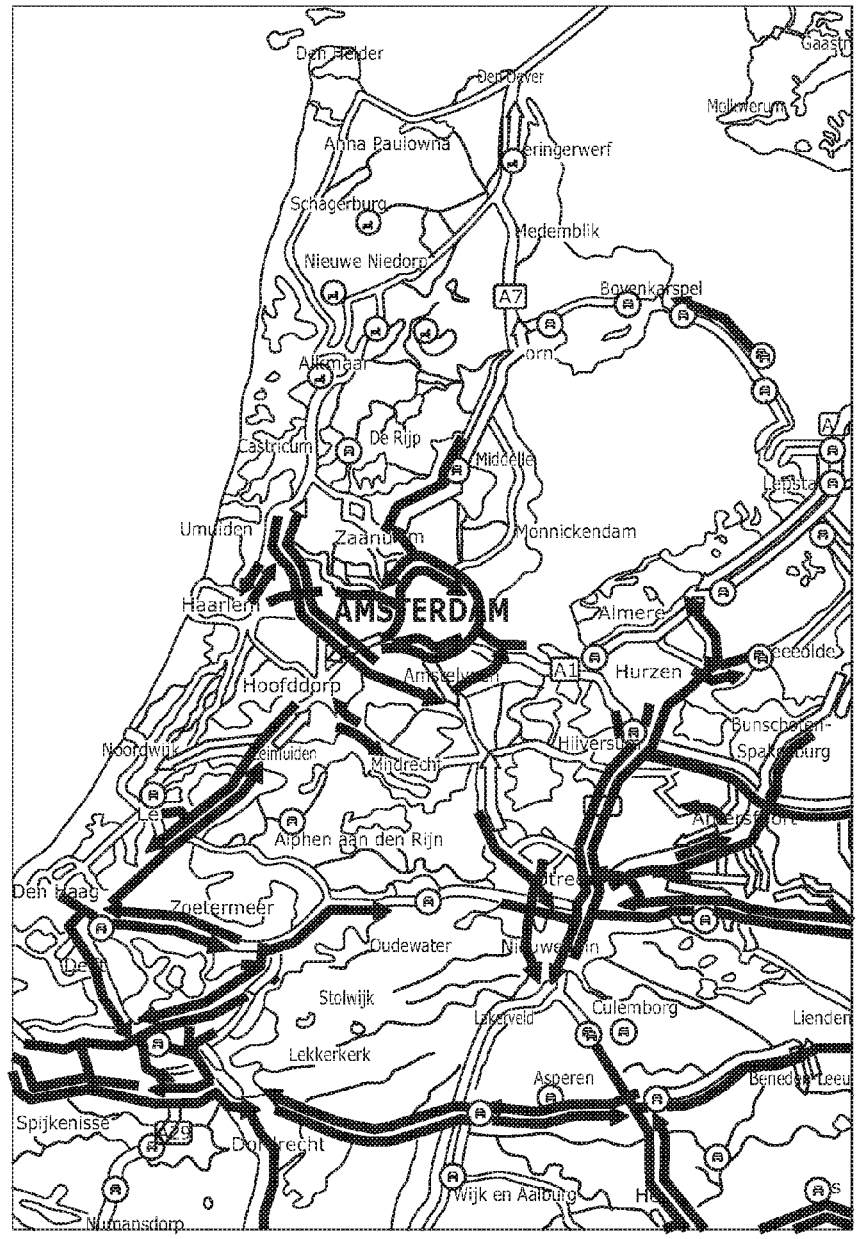
FIG. 8 illustrates traffic densities corresponding to an area of FIG. 7.

FIG. 8 illustrates current traffic conditions in at least part of the same region as in FIG. 7 where road segments subject to heavy traffic are indicated with increasingly heavier highlighting. FIG. 8 is provided for comparison purposes to show the differences between the present invention, in which the user is shown optimum routes to possible destinations taking account of current traffic information, and prior art arrangements in which the user is only shown the current traffic information. In other words, in embodiments of the present invention, the user is provided with a view which enables them to follow a route to their destination, even if they have not entered that destination into the navigation device 200. Furthermore, even if the user's specific destination is not identified, perhaps because the user's destination is a small village proximal to a city centre for example, the user is informed to follow signs on roads directing them toward the proximal city centre until they are close to their destination. Thus the user may follow a better route than without the display of possible destinations.

Figure 9:
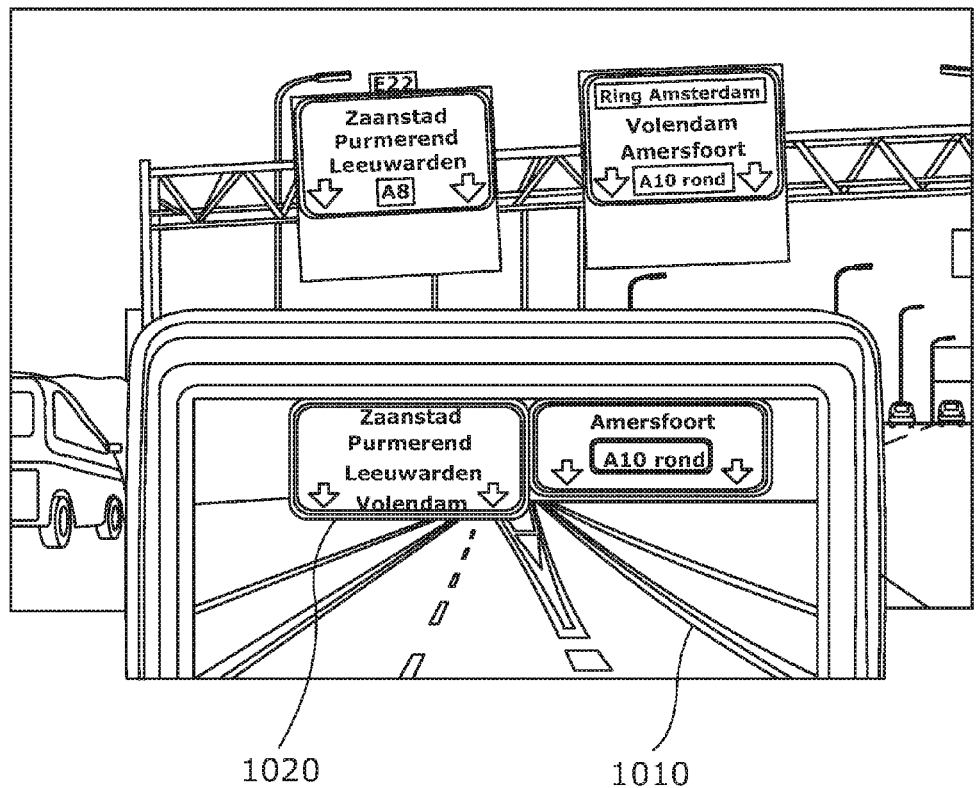
FIG. 9 illustrates an output of a further embodiment of the invention.

FIG. 9 illustrates an alternative view according to some embodiments of the invention which may be displayed on the display screen 240 by the DPM 410. The view shown in FIG. 9 is a dynamic driving view which provides an indication of directions to one or more possible directions according to the determined route(s) thereto. The dynamic driving view may also be referred to as a junction view or advanced lane guidance view. In the dynamic driving view a representation 1010 of a road network immediately ahead of the user's current location is provided on the display screen 240. The dynamic driving view further comprises, at relevant locations such as approaching road junctions, etc, an indication of directions 1020 to possible destinations. The possible destinations may be those closest to the navigation device's current location in the current heading. FIG. 9 also shows, in its upper portion, a picture of the actual road network at the location of the navigation device 200 and associated road signs. It will be noted in the actual road network that the route to Volendam is indicated to the right on the A10 north (noord). However, in the dynamic driving view, Volendam is in contrast identified as a possible destination on the left-hand road segment. The change in direction for Volendam may be due to the user's choice of route preferences and/or traffic conditions on the actually signposted route. Thus the dynamic driving view enables the user to follow a route suited to their route preferences or current traffic conditions.

In step 680 it is determined whether the navigation device 200 has reached the user's destination. In some embodiments the determination may be made based upon whether the location of the navigation device corresponds to one of the possible destinations. However, the arrival at the destination may also be determined in other ways which are useful when the user's destination does not exactly correspond to one of the possible destinations. For example, the arrival at the destination may be determined when the location of the navigation device does not change for more than a predetermined period of time, or the navigation device or software providing the navigation device functionality, is turned off. If it is determined that the user has arrived at the destination, then the method ends. Otherwise, the method returns to step 620 where possible destinations are reselected on the basis of the new location of the navigation device 200. In some embodiments a delay period may be introduced prior to re-execution of step 620. The delay period may be, for example, 30 seconds, although other periods may be chosen. In other embodiments, step 620 may only be re-executed when the location of the navigation device 200 corresponds to a road feature, such as the navigation device 200 passing a road junction or highway or the like exit. Similarly, in some embodiments step 620 may be re-executed when a user has entered a sub-branch of a route to one or more possible destinations.

Figure 10:
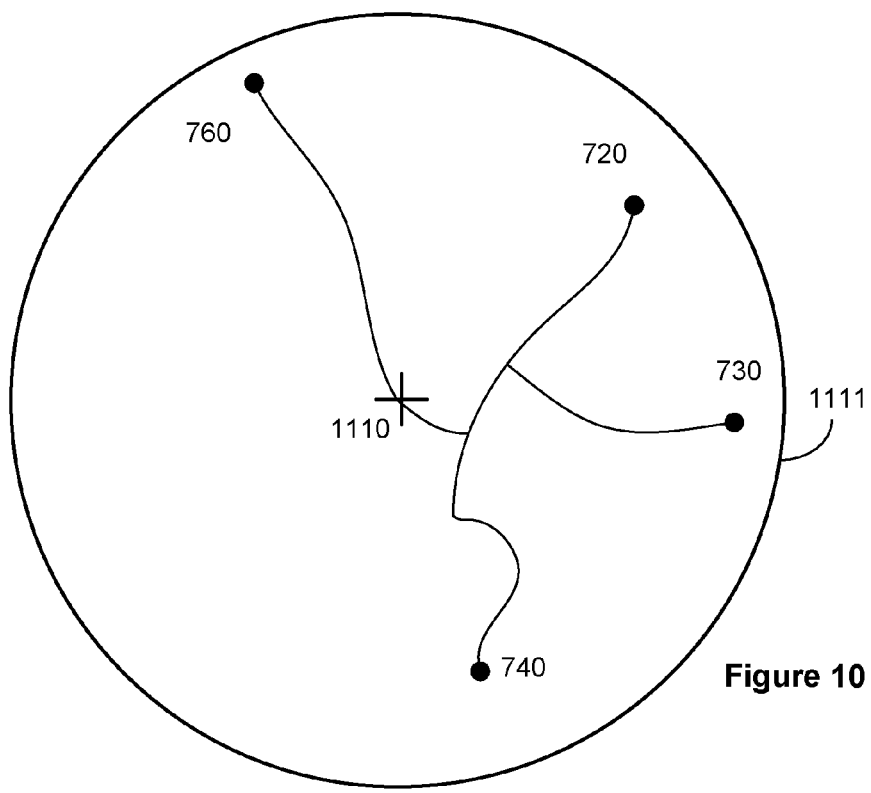
FIG. 10 illustrates a road network and updated possible destinations identified according to an embodiment of the invention.

In a following iteration of the method 600, when step 620 is re-executed one or more new possible destinations may be selected which are within the predetermined distance of the navigation device 200. FIG. 10 shows a geographic area around the new location 1110 of the navigation device 200 subsequent to that shown in FIG. 7. It can be appreciated that the location 1110 of the navigation device is changed to that 710 shown in FIG. 6. The location 1110 is further along the route toward possible destinations 720, 730. It can be observed that possible destinations 720, 730 remain within the new location of the region 1111 extending the predetermined radius from the new location 1110. However, possible destination 750 has been removed from the list of possible destinations. This may be because it resides outside of the region 1111 or it was removed due to its increase in journey duration being above the threshold, as previously explained. Furthermore, a new possible destination 760 has been selected due to its location being within the region 1111. It will be appreciated that the list of possible destinations is continually updated by adding new possible destinations.

Figure 11:
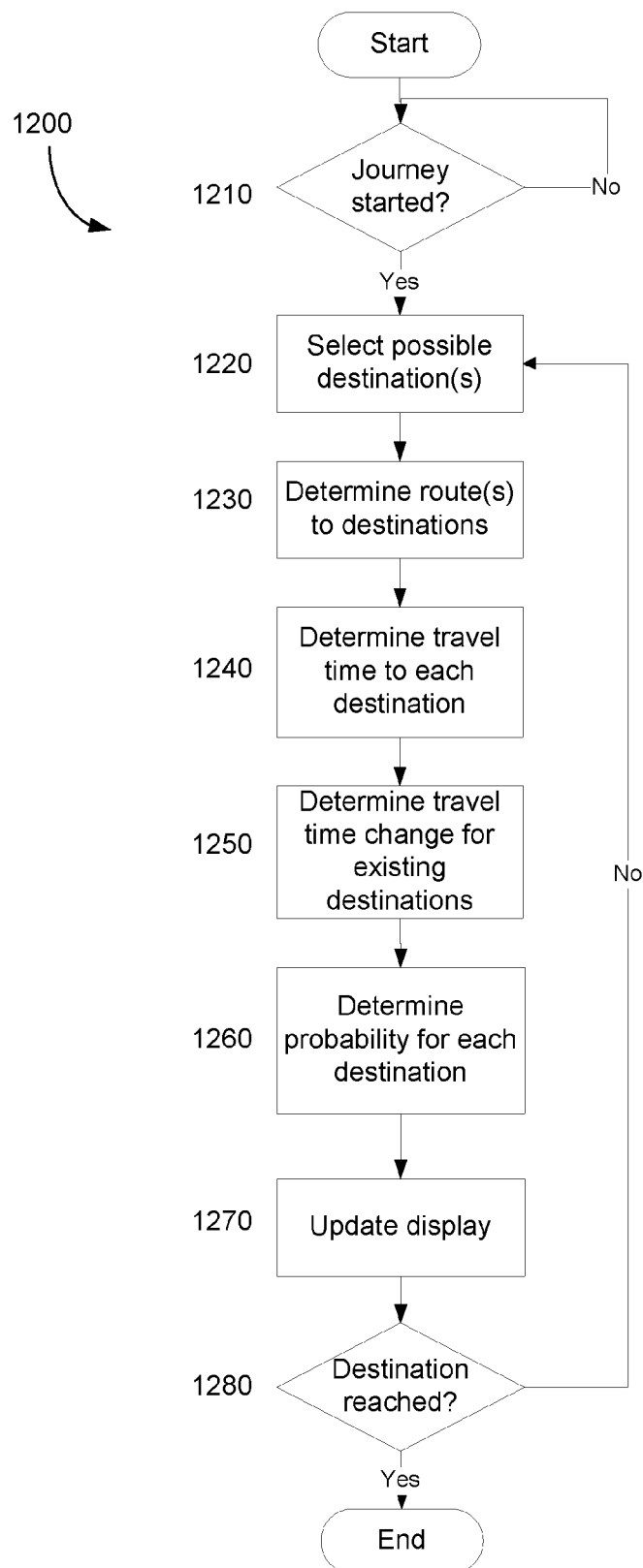
FIG. 11 illustrates a method according to another embodiment of the invention.

FIG. 11 illustrates a method 1200 according to a further embodiment of the invention. The method comprises steps 1210-1250 & 1270-1280 which, unless otherwise described, are identical to the corresponding steps in the method 600 of FIG. 6.

The method 1200 comprises a step 1260 in which a relative probability value is determined for each possible destination selected in step 1220. The probability value is indicative of the user's actual destination being the associated possible destination. In one embodiment, the probability value for a respective possible destination is based upon the change in journey duration Δt calculated in step 1250 for the possible destination, a maximum change in journey duration for one of the possible destinations i.e. the maximum value of Δt from amongst all possible destinations where a positive value indicates an increase in journey time to the possible destination, and the sum of all journey durations for the possible destinations, as will be explained.

In some embodiments the relative probability for each possible destination is determined as follows. As noted above, destination, is an array of possible destinations where I=1 . . . N; $\Delta t_i$ is the change in journey duration for the possible destination i; $\Delta t_{max}=\max(\Delta t_i)$ finds the maximum change in journey time from amongst all possible destinations;

$$\Delta trelative_i = \Delta t_{max} - \Delta t$$

determines a relative change in journey time for each possible destination based upon the maximum change in journey time;

$$t_{total} = \sum_{i=1}^{N} \Delta trelative_i$$

determines a total relative journey duration for all possible destinations based upon the respective relative journey times; and the relative probability for each possible destination may be determined as:

$$P_i = \frac{\Delta trelative}{t_{total}}$$

By way of an example, for four destinations having Δt values of [−4, −6, 3, 5] in minutes and $\Delta trelative_i$ values of [9, 11, 2 0] give $\Delta t_{max}$=5 minutes, $t_{total}$=22 minutes and the associated probabilities $P_i$ are [0.409, 50, 0.0901, 0] or 40.9%, 50%, 9.1% and 0%, respectively.

In some embodiments, step 1260 further comprises removing destinations from the list of possible destinations having less than a predetermined probability value. The plurality of possible destinations may be those destinations having a probability of less than a predetermined value, such as 30% although values may be chosen. Thus in this example possible destinations 3 and 4 would be removed from the list of possible destinations. In this way possible destinations which are determined to be unlikely to be proximal to the user's actual destination are removed.

In step 1270 the display may be updated based upon the probability $P_i$ associated with each possible destination. For example, in the map view display of FIG. 7 possible destinations may be displayed indicative of their probability value. Visual parameters which may be indicative of the probability value of an associated possible destination are a display colour of the possible destination or route thereto, or a thickness of road segments forming the route. In the driving view of FIG. 9 direction signs may be displayed for one or more possible destinations having a highest probability of being the user's actual destination.

Whilst the possible destinations selected by the methods shown in FIGS. 6 and 11 have been described as being used to provide travel information to the user of the navigation device 200, some embodiments of the invention may use the predicted destinations for other purposes. In one embodiment, the possible destinations may be used for traffic prediction. The list of possible destinations selected in step 620 or 1220 may be utilised to provide an indication of future traffic on road segments. For example, a server computer may receive the list of possible destinations and, in the embodiments described with reference to FIG. 11, the associated probability for each possible destination. The server may then select the possible destination having the highest probability for the respective user. When performed for a plurality of users, the future traffic to the possible destinations having the highest probability may be predicted. In another embodiment, one or more predicted destinations for the user may be used to provide advertisements to the user relevant to their predicted destinations.

Figure 12:
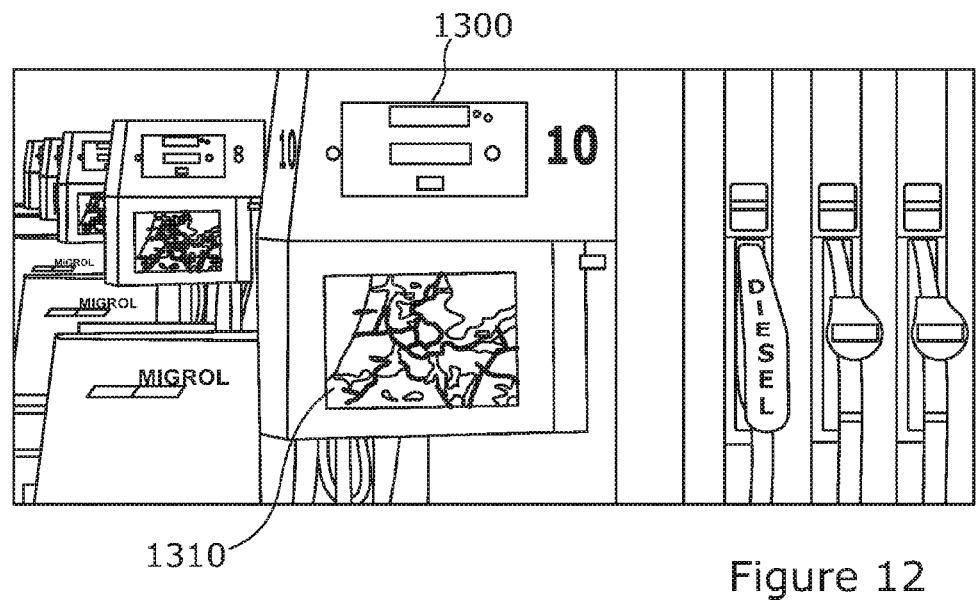
FIG. 12 illustrates a display device displaying information according to an embodiment of the invention.

FIG. 12 illustrates an embodiment of the invention in which one or more possible destinations are displayed on a display device. FIG. 12 illustrates a refuelling station for a vehicle 1300. In FIG. 12 the refuelling station is a hydrocarbon fuel pump i.e. suitable for delivering liquid fuels such as petrol, diesel etc to a vehicle. However it will be realised that embodiments of the invention are not limited in this respect and that the refuelling point may be suitable for providing other fuels, including electricity, hydrogen, etc, to the vehicle. The refuelling station comprises a display device 1310 which is controlled by a processing device executing the DPM 410, located either locally or remotely from the refuelling station, to display one or more possible destinations and a respective route to each possible destination, as will be explained.

Figure 13:
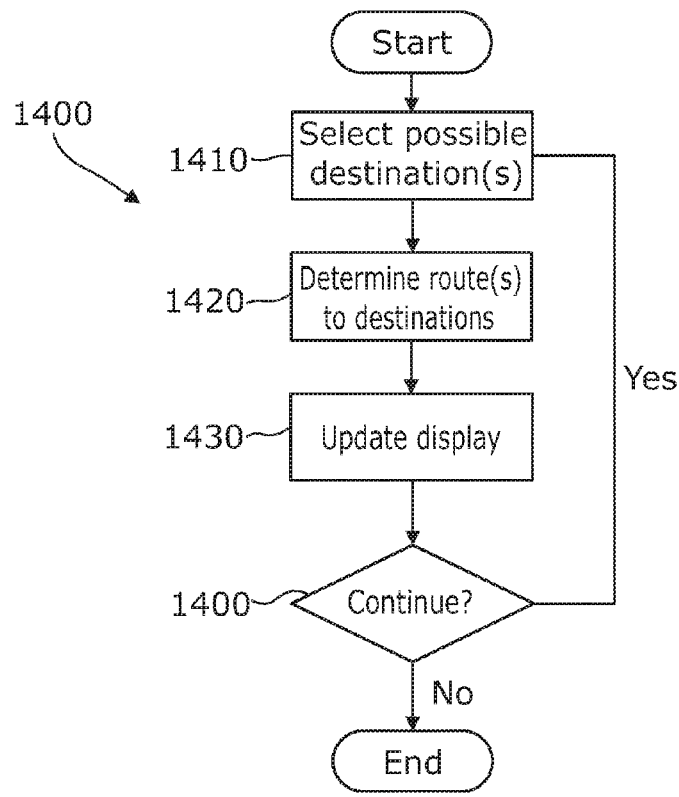
FIG. 13 illustrates a method according to a further embodiment of the invention.

FIG. 13 illustrates a method 1400 according to an embodiment of the invention which may be performed in association with the display device 1310 of the refuelling station 1300. It will be realised that the method may be performed in association with other types of display device arranged at a fixed or static location. These other display devices include, but are not limited to, display signposts and similar devices arranged to provide information to passing traffic, such as the drivers of vehicles, as will be explained in more detail below.

FIG. 13 comprises some steps which are equivalent to those explained previously with reference to the method of FIGS. 5 and 11. Extensive discussion of these steps will not be repeated for clarity and instead the reader is referred to the explanations provided above. The method 1400 comprises a step 1410 of selecting one or more possible destinations. Step 1410 is equivalent to steps 620, 1220 explained previously. However, step 1410 may be performed with reference to the location of the display device 1310 in the method 1400. That is, the one or more possible destinations may be selected as possible destinations within a predetermined radius of the display device 1310. As previously explained the one or more possible destinations may be geographic locations within the predetermined radius of display device 1310, such as points-of-interest, exits from major roads or city centres. For the purposes of explanation city centres will be used, although it will be noted that this is not intended to be limiting.

In some embodiments of the invention the display device 1310 is located such that its viewers may be heading in any direction. For example, the refuelling station may be located at an intersection to service traffic heading in any direction. However in other embodiments the refuelling station may be located such that only traffic heading in a particular direction may be serviced, such as on one side of a highway, autoroute or motorway. In these cases, the selection of the possible destinations may be limited by direction information associated with the traffic heading viewing the display device 1410. For example, the possible destinations may be selected as being within a circular sector of a particular angle θ and the predetermined radius. The angle θ may be 180°, 90° or 60° centred on the heading of the road with which the refuelling station is associated, although it will be realised that other angles may be chosen. Thus in some embodiments, the selection of possible destinations in step 1410 is constrained by one or more criteria associated with the display device 1310. Furthermore, it is envisaged in some embodiments that direction information may be wirelessly received from the vehicle in step 1410 and used to constrain the selection of possible destinations in step 1410. For example, the refuelling station 1310 may comprise an antenna for communicating with the vehicle or navigation device 200 to receive direction information, such as information indicative of a heading of the vehicle based upon a portion of its journey prior to arriving at the refuelling station. The circular sector may then be oriented based upon the received direction information.

In step 1420 a route to each possible destination is determined. The route may be determined based upon digital map data and one or more route planning criteria. For example, each route may be determined according to route planning criteria which require that a fastest route to each destination be found, or that a route having a shortest distance to each possible destination be found. Step 1420 may comprise performing a plurality of source-to-destination route searches using an appropriate algorithm, such as a Dijkstra-based route search, although other types of route search algorithm may be used.

The determination of the route to each possible destination in step 1420 may comprise consideration of traffic information which indicates a real-time, or near-real-time, traffic situation between the location of the display device 1310 and each possible destination. Furthermore, in some embodiments, the determination of the route in step 1420 may comprise consideration of historic route information, i.e. indicative of conditions of road segments or routes typically followed by users at a time interval corresponding to the performance of the route search. For example, the historic information may indicate that at the time the route search is being performed the speed of traffic flow along one or more road segments is usually reduced in comparison to the speed of traffic that would normally be expected along that class of road segment. Thus the route search may take this reduced traffic speed into account when determining the route.

In step 1430 the display device is updated. The display device may be caused in step 1430 to display each of the possible destinations selected in step 1410 and an indication of the route to each possible destination determined in step 1420. In this way the viewer is provided with an indication of the current best way to each of the possible destinations. Even in the case that the viewer's destination is not one of the possible destinations; by appreciating the best way to each destination they may modify their route to a proximal destination accordingly.

In step 1440 it is determined whether the method 1400 is to be continued. In some embodiments the method 1400 may continually loop, in which case the method always returns to step 1410. However in other embodiments the method may only return to step 1410 during predetermined operational time periods, or only when there is a vehicle using the refuelling station. If the method is not to continue, then the method ends.

Whilst the method 1400 shown in FIG. 13 was explained mainly with reference to the display device 1310 located at a refuelling station, it may be utilised elsewhere, as noted above. For example, road signs on road segments of the road network may each comprise a display device capable of dynamically displaying place names and may also display other information. The method 1400 may be used to determine on which of the direction signs each of a plurality of place names is displayed according to information associated with each possible destination. For example, the city of Utrecht may be selected as a possible destination in step 1410 and a route thereto determined in step 1420 in accordance with current traffic conditions. Based on the determined route, a first road sign can be controlled to display the place name in preference to another road sign, which might typically (e.g. without the current traffic situation) display the place name. In other words, the directions appearing on road signs may be dynamically updated by the method of FIG. 13. The signs may also show additional information such as an estimated time to each destination based on the route determined in step 1420. Furthermore, in some embodiments, each sign may also show one or more advertisements associated with the direction(s) appearing on the corresponding sign. It will also be appreciated that such advertisements may be shown in the dynamic driving view of FIG. 9 displayed by the navigation device 200.

It will be appreciated that whilst various aspects and embodiments of the present invention have heretofore been described, the scope of the present invention is not limited to the particular arrangements set out herein and instead extends to encompass all arrangements, and modifications and alterations thereto, which fall within the scope of the appended claims.

For example, whilst embodiments described in the foregoing detailed description refer to GPS, it should be noted that the navigation device may utilise any kind of position sensing technology as an alternative to (or indeed in addition to) GPS. For example, the navigation device may utilise other global navigation satellite systems, such as the European Galileo system. Equally, it is not limited to satellite-based systems, but could readily function using ground-based beacons or other kind of system that enables the device to determine its geographic location.

It will also be well understood by persons of ordinary skill in the art that whilst the described embodiments implement certain functionality by means of software, that functionality could equally be implemented solely in hardware (for example by means of one or more ASICs (application specific integrated circuit)) or indeed by a mix of hardware and software. As such, the scope of the present invention should not be interpreted as being limited only to being implemented in software.

Lastly, it should also be noted that whilst the accompanying claims set out particular combinations of features described herein, the scope of the present invention is not limited to the particular combinations hereafter claimed, but instead extends to encompass any combination of features or embodiments herein disclosed irrespective of whether or not that particular combination has been specifically enumerated in the accompanying claims at this time.

The invention claimed is:

1. A computer-implemented method of predicting a destination of a user of a mobile device, comprising:
   selecting a plurality of geographic locations as a group of possible destinations based on a first location of the mobile device;
   determining a route from the first location to each of the geographic locations of the group of possible destinations according to one or more route planning criteria and digital map data; and
   updating the group of possible destinations based upon: (i) a second location of the mobile device; (ii) and a change in an attribute of a route between the second location and each geographic location of the group of possible destinations,
   wherein the updating comprises: removing one or more geographic locations from the group of possible destinations in response to the attribute indicating that the mobile device is travelling away from those geographic locations; and adding one or more geographic locations to the group of possible destinations based upon the second location of the mobile device.

2. The method of claim 1, wherein the attribute is one of a journey time or distance of the route to each geographic location in the group of possible destinations.

3. The method of claim 2, wherein the removal of one or more geographic locations from the group of possible destinations is in response to the journey time exceeding a predetermined time from a lowest encountered journey duration.

4. The method of claim 1, wherein the updating comprises determining a probability associated with each geographic location of the group of possible destinations based on the change in the attribute and a sum of all attributes of the geographic locations of the group, wherein the probability is indicative of the respective geographic location being proximal to the user's actual destination.

5. The method of claim 1, wherein the one or more geographic locations are selected according to a predetermined distance from the first location.

6. The method of claim 1, wherein the one or more geographic locations are added to the group of possible destinations according to a predetermined distance from the second location.

7. The method of claim 1, comprising displaying on a display device an indication of each of the geographic locations of the group of possible destinations.

8. The method of claim 7, comprising displaying on the display device a representation of the digital map data including the indication of each of the geographic locations and an indication of one or more road segments forming the route to each geographic location.

9. The method of claim 1, wherein the location of the mobile device is determined by a location determining module arranged to receive global navigation satellite signals.

10. An apparatus arranged to predict a destination of a user, comprising: a processor; and a memory, accessible to the processor, storing digital map data representative of a geographic region, wherein the processor is arranged to:
   select a plurality of geographic locations as a group of possible destinations based on a first location of a mobile device;
   determine a route from the first location to each of the geographic locations of the group of possible destinations according to one or more route planning criteria and the digital map data; and update the group of possible destinations based upon: (i) a second location of the mobile device; (ii) and a change in an attribute of a route between the second location and each geographic location of the group of possible destinations, wherein the updating comprises: removing one or more geographic locations from the group of possible destinations in response to the attribute indicating that the mobile device is travelling away from those geographic locations; and adding one or more geographic locations to the group of possible destinations based upon the second location of the mobile device.

11. The apparatus of claim 10, wherein the attribute is one of a journey time or distance of the route to each geographic location in the group of possible destinations.

12. The apparatus of claim 11, wherein the removal of one or more geographic locations from the group of possible destinations is in response to the journey time exceeding a predetermined time from a lowest encountered journey duration.

13. The apparatus of claim 10, wherein the updating comprises determining a probability associated with each geographic location of the group of possible destinations based on the change in the attribute and a sum of all attributes of the geographic locations of the group, wherein the probability is indicative of the respective geographic location being proximal to the user's actual destination.

14. The apparatus of claim 10, wherein the one or more geographic locations are selected according to a predetermined distance from the first location.

15. The apparatus of claim 10, wherein the one or more geographic locations are added to the group of possible destinations according to a predetermined distance from the second location.

16. The apparatus of claim 10, wherein the processor is arranged to display on a display device a representation of the digital map data including an indication of each of the geographic locations and an indication of one or more road segments forming the route to each geographic location.

17. The apparatus of claim 10, wherein the apparatus is a server computer, and wherein the server computer is arranged to receive trace data from one or more mobile devices and to determine the location of each mobile device therefrom.

18. A non-transitory computer-readable medium comprising computer software operable, when executed on a computing device, to cause one or more processors to perform the method of claim 1.

19. The method of claim 1, comprising periodically receiving updates to the digital map data and recalculating the route to each of the possible destinations using the updated digital map data.

20. An apparatus arranged to predict a destination of a user, comprising:
a processor;
a memory, accessible to the processor, storing digital map data representative of a geographic region; and
a display device;
wherein the processor is arranged to:
select a plurality of geographic locations as a group of possible destinations based on a first location of a mobile device, wherein the plurality of geographic locations are within a predetermined area around the first location;
determine a route from the first location to each of the geographic locations of the group of possible destinations according to one or more route planning criteria and the digital map data;
display on the display device an indication of each of the geographic locations of the group of possible destinations;
update the group of possible destinations based upon: (i) a second location of the mobile device and (ii) a change in an attribute of a route between the second location and each geographic location of the group of possible destinations, wherein the attribute is a journey time and/or distance of the route, wherein the updating comprises: removing one or more geographic locations from the group of possible destinations in response to the attribute indicating that the mobile device is travelling away from those geographic locations; and adding one or more geographic locations to the group of possible destinations based upon the second location of the mobile device, wherein the one or more added geographic locations are within a predetermined area around the second location; and
display on the display device an indication of each of the geographic locations of the updated group of possible destinations.

* * * * *